May 4, 1965 P. TROMBETTA 3,181,665
ELECTRICALLY CONTROLLED BRAKE
Filed Oct. 16, 1961 3 Sheets-Sheet 3
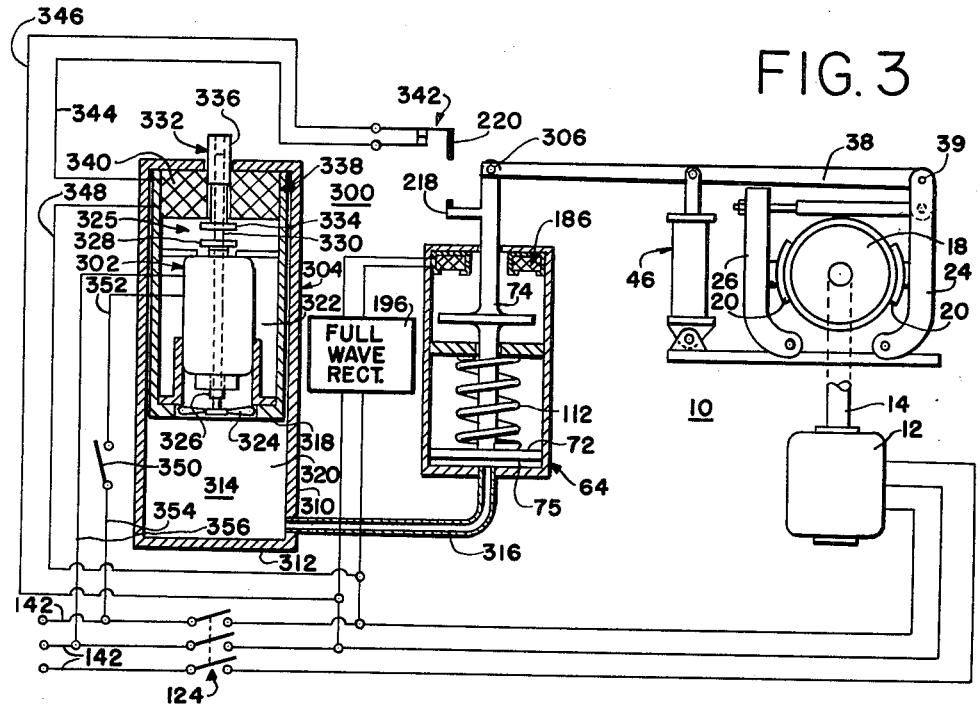
FIG. 3
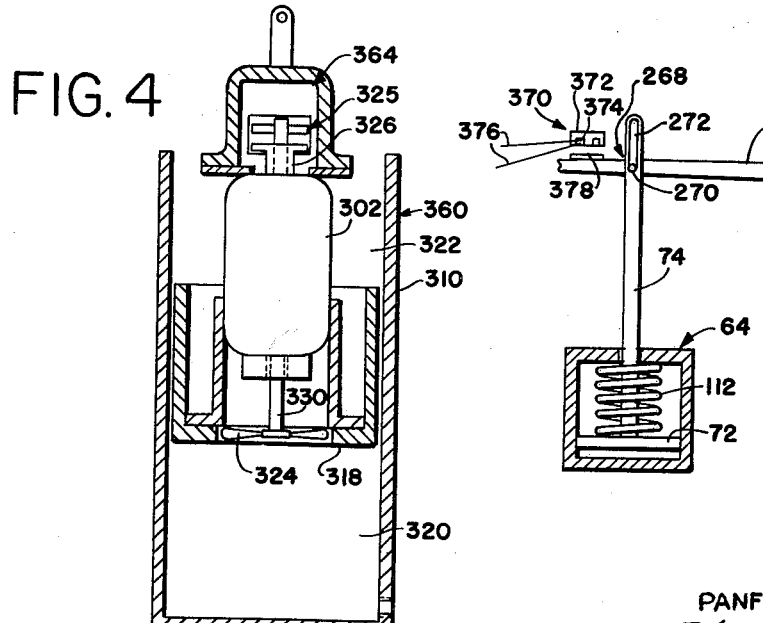
FIG. 4
FIG. 5
INVENTOR.
PANFILO TROMBETTA
BY Mason, Kolehmainen,
Rathburn & Wyss.
ATTORNEYS

# United States Patent Office 3,181,665
Patented May 4, 1965

3,181,665
ELECTRICALLY CONTROLLED BRAKE
Panfilo Trombetta, 329 N. Milwaukee St.,
Milwaukee, Wis.
Filed Oct. 16, 1961, Ser. No. 145,390
11 Claims. (Cl. 192—2)

The present invention relates to electrically controlled industrial brakes and more particularly to electrically controlled industrial brakes which are movable between set and released positions and which are spring biased to one position and electrically actuatable to the other position. One such industrial brake is described in my earlier Patent No. 2,693,866, granted November 9, 1954.

Electrically controlled brakes are extensively used in industrial applications of all sorts. They are widely employed with elevators, hoists, and the like. In the early development of the automatically operated industrial brakes, the electrical solenoid was found to be a very efficient, economical and simple motive unit for the brake and has become widely used for the automatic operation of mechanisms such as industrial brakes which require the use of moderate forces acting through small or moderate strokes. The extension of the automatic operation of industrial brakes has increased the requirements to a larger force at longer strokes. Being unable to use solenoids for the larger motive requirements, other means such as Semotors and Recipromotors have been used for the electrical operation of automatic mechanisms. However, such devices do not act as quickly as an alternating current solenoid or as a direct current solenoid of small or medium size. Therefore, although other motive units besides the solenoid have been very successful in that they provide the larger force required for operation, they are all subjected to the difficulty that they are too slow in operation for a number of applications. Motive mechanisms which are sluggish and inconvenient, however, have been used in the brakes of hoists, cranes, and elevators of larger sizes since such motive units have been capable of providing the required forces, although the sluggishness of the motive unit when applied to industrial brakes has subjected them to a number of difficulties.

One such difficulty which arises in the slow setting or release of an industrial brake results in that when the prime mover or motor is de-energized there is nothing to hold the load in the interim prior to the application of the brake, and, similarly, when the motor is initially energized and if the brake is not released instantly the motor will run with the brake set. In the first instance, if the load is moving downwardly in certain cases it will accelerate and when the brake finally gets a hold of the load it will put a very heavy strain on the cable due to the jerk. If the load is moving up against gravity it will begin to slip back and the same phenomena results. In the second case where the motor is energized prior to the release of the industrial brake, the development of torque by the motor will cause the motor to run with the brake set and will create excessive wear on the brake linings and excessive heating on the brake drum. Of course, the amount of this kind of damage will depend upon the design and construction of the controls governing the starting of the motor and the amount of delay in the releasing of the brake. When the prime mover is an electric motor, with a given time delay inherent in many great systems, the damages will be a maximum with the use of an across-the-line starter or other instant starting device, and will become small with starters giving more gradual starting operations. Although motive units such as described in the present invention can replace the slow operating motive units mentioned above, the present invention makes it possible to eliminate the inconvenience inherent in the slow operation of the conventional motive units that have been used in the operation of industrial brakes for many years.

Another difficulty which arises when electrically released brakes are operated simultaneously with the starting up of large electrically operated prime movers is that the in-rush current drawn by the electrical motive units, such as solenoids, together with the in-rush current drawn by the prime mover, may cause so much voltage drop on the line that the motive units may not have enough power to complete their movement quickly, resulting in the burning of the motive units and damaging of the motors because they are stalled on the line and because of the tremendous amount of current running through them without being able to get started. It is therefore desirable to excite an electrical prime mover at a selected time after release of a brake in order to obtain a smooth start and in order to eliminate all the inconveniences resulting from the sluggishness of the motive unit or from the high in-rush current drawn by it.

Another difficulty which has arisen in connection with spring-set, automatically-released industrial brakes is that in the spring setting of the brakes, the brakes may have to operate against the restraining force of the motive unit returning to its released or neutral position. This difficulty is particularly severe when an electropneumatic unit is employed as the motive unit. It is therefore desirable that the motive unit may return to its neutral or released position after actuation of the brake control so that when the power is cut off from the industrial brakes, the spring setting of the brakes is accomplished almost instantaneously.

One further difficulty exists in the use of motive fluid actuated units when the fluid unit is used to hold the brake in a released position; that is, in the operation of industrial brakes in which the fluid cylinder has to hold the brake in the operated position, any leakage in either the pump of the electromotive unit or the working cylinder thereof will result in a gradual failure of the mechanism. In the case of an industrial brake which is sometimes required to remain in the released position for many hours or even days, any leakage in either the pump system cylinder or the working cylinder would cause the brake to gradually set because the working cylinder would recede from its brake-released position. It is therefore desirable that other means besides the motive unit be employed to hold the industrial brake in a released position and that the motive unit operate only to move the brake control from the set to the released position.

Such an independent holding unit has the additional advantage that the motive unit, such as a solenoid or a Recipromotor, may be cut off from the line during the operation of the brake while the prime mover is running, providing a more reliable system and permitting the motive units to be much smaller and greatly overloaded for the instant that they perform the releasing operation so that the motive units are not susceptible to overheating and, therefore, capable of much longer life, and, in addition, reduce the amount of power consumed by the motive unit during the running of the prime mover.

It is, therefore, an object of the present invention to provide an improved industrial brake which overcomes the aforementioned difficulties.

A further object of the present invention is to provide an improved quick-acting industrial brake wherein the speed of acting and releasing the brake is controlled.

A further object of the present invention is to provide an improved electrofluid operated motive unit for an industrial brake.

A further object of the present invention is to provide an electrofluid operated and electromagnetically held motive unit for an industrial brake.

A further object of the present invention is to provide an improved slow-operating motive unit which is completely satisfactory both during the starting period and stopping period of the prime mover.

A further object of the present invention is to interlock and interconect the motive unit of an industrial brake with the controlling system for the prime mover thereof so that the power is applied first to the motive unit operating the brake and then to the prime mover after the brake has been partially released, thereby eliminating the inconveniences which result from sluggish operation of the motive unit or from the high in-rush current drawn by it.

A further object of the present invention is to provide an improved electrically released industrial brake in which the motive unit does not run during the entire time of operation of the prime mover.

A further object of the present invention is to provide an industrial brake which is set a preset amount of time after the power has been cut off from the prime mover.

A further object of the present invention is to provide an improved economical motive unit for an industrial brake.

Further objects and advantages of the invention will become apparent as the following description proceeds and the features of novelty which characterize the invention will be pointed with particularity in the claims annexed to and forming a part of the specification.

Briefly stated, the present invention relates to a motive unit for actuating an industrial brake, and to an industrial brake, which in turn controls a prime mover. A conventional industrial brake includes a brake drum connected to the prime mover and a pair of opposed brake shoes operatively associated with the brake drum and movable relative thereto between a set position and a released position. The brake is normally urged by spring means to one of the positions, and actuation of the brake to the other of the positions is accomplished by an electromotive unit according to the present invention, and, specifically, by an electromotive fluid actuated unit. Although the brake herein specifically described is spring set and automatically released, it is to be understood that the invention is equally applicable to a spring-released, automatically set brake. According to one embodiment of the present invention, the motive unit includes an electrohydraulic pump and a working hydraulic cylinder which is connected to move the brake into one of its above-mentioned positions. When applied to a spring-set electrically released industrial brake, the motive unit is effective to start the release of the brake and, if desired, to energize the prime mover after the brake has been partially released. Moreover, means may be provided for controlling the energization of the prime mover at a preset time after initiation of the setting of the brake. Moreover, independent means are provided for latching or holding the brake in a released position so that, if desired, the electrohydraulic motive unit may be returned to a neutral position as soon as the release of the brake is complete, thereby providing for a more rapid setting of the brake when the latch is released. Alternatively, the motive unit may be held in a brake-released position even though the power thereto has been shut off, and return of the electrohydraulic unit to its neutral position may be utilized to control the rate of setting of the brake whenever it is desired to interject a delay in the setting time of the brake.

According to one embodiment of the invention, the pump unit comprises a main fluid or hydraulic cylinder and a piston movable therein and driven by an electromagnetic solenoid to provide the driving force for the motive unit.

According to another embodiment of the present invention, a pump with the smallest possible time delay is provided which consists of a rotary electric motor and a propeller clutched to the motor operatively connected in a hydraulic cylinder to provide the pressurized working fluid for the unit. If it is desired to minimize the time constant of operation of the electrohydraulic unit on starting of the unit, the electric motor will first be brought to full speed and then the propeller will be clutched to the rotor so that the high moment of inertia of the motor rotor is utilized in accelerating the propeller, the moment of inertia of which is very small. The large moment of inertia of the rotor rapidly accelerates the propeller so that a high pressure is produced almost instantly by the clutching of the propeller to the rotating rotor. Moreover, when it is desired to stop the propeller, the propeller is unclutched from the motor rotor and as the moment of inertia of the propeller is very minute as compared with the moment of inertia of the motor rotor, the propeller will come quickly to a dead stop, thereby releasing the pressure from the actuating cylinder. Alternately, a reversing pitch propeller or reversible clutch may be utilized to release the pressure from the actuating cylinder.

The nature of the invention will best be understood when described in connection with the accompanying drawings, in which:

FIG. 3 illustrates a spring-set, electrohydraulically released industrial brake according to yet another embodiment of the present invention;

FIG. 4 is another embodiment of an electrohydraulic pump of a motive unit for an industrial brake according to yet another embodiment of the present invention; and FIG. 5 is a partial view illustrating means of holding the industrial brake in a released condition according to yet another embodiment of the present invention.

Figure 1:
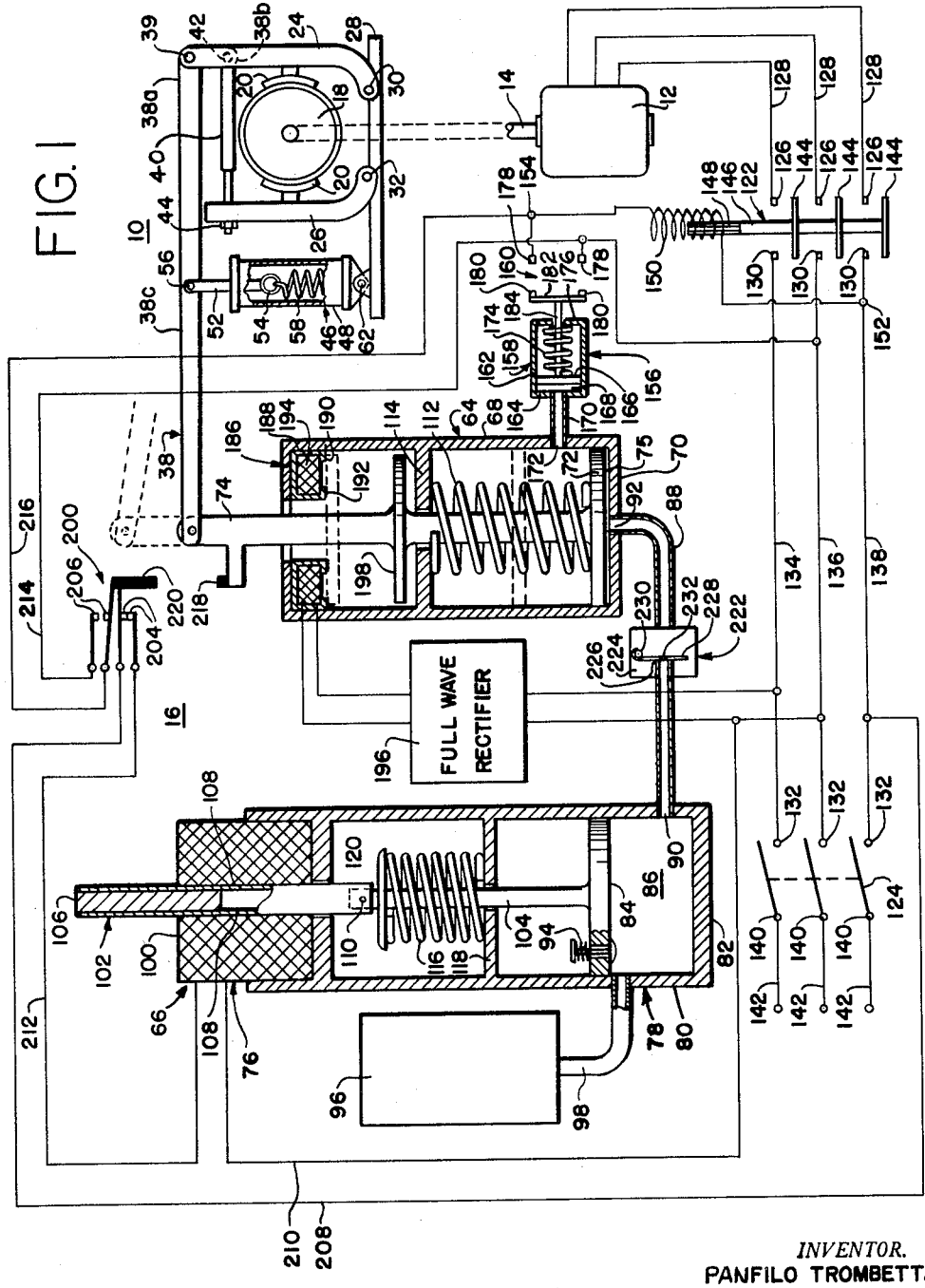
FIG. 1 is a somewhat schematic illustration of a spring-set, electrohydraulically released industrial brake according to the present invention.

Referring now to the embodiment of the invention illustrated in FIG. 1, there is illustrated an industrial brake including a brake portion illustrated generally at 10 and mechanically coupled to a prime mover, here shown as a three-phase electric motor 12, by means of a shaft 14, illustrated somewhat schematically, and controlled by an electrofluid motive unit, illustrated generally at 16. As illustrated, the brake portion 10 is spring-set, electrically-released and comprises a conventional brake drum or brake wheel 18 which is conventionally keyed or otherwise secured to the shaft 14 of the prime mover 12. The prime mover 12, which is connected to the brake drum 18, may be used to control an elevator, a hoist or other suitable objects which it is desired further to control by the industrial brake of the present invention.

For the purpose of frictionally controlling the brake drum 18, there are provided a pair of brake shoes 20 which have the conventional concave surfaces conforming to the shape of the periphery of the brake drum 18. Obviously, the brake shoes 20 could have convex surfaces for application to the interior surfaces of a suitable brake drum. In order to support the brake shoes 20 adjacent the brake drum 18, there are provided a front shoe supporting arm 24 and a rear brake shoe supporting arm 26. These brake shoe supporting arms 24 and 26 may comprise castings of suitable material and the lower portions of these shoes are pivotally mounted to a base member 28 through a pair of pivot pins 30 and 32.

For the purpose of causing relative movement between the shoe supporting arms 24 and 26, there is provided a main control rod member or lever 38 having one end 38a pivotally mounted to the top of the front shoe supporting arm 24 through a pivot pin 39. Moreover, the pivoted end of the main lever 38 is provided with a downwardly extended elongated portion forming a short arm 38b so that there is defined an L-shaped member with the short arm 38b and with the main lever portion 38c defining the long arm of the L. In order to interrelate the two shoe supporting arms 24 and 26, there is provided a tie bar 40 which has one end thereof pivotally connected to the short arm 38b of the control lever 38 by a pivot pin 42. The end of the tie bar 40 remote from the pivot pin 42 is threaded so as to accommodate suitable nut means 44 and slidably extends through an aperture in the rear brake shoe supporting arm 26, thereby to adjust a maximum separation between the ends of the two supporting arms 24 and 26. It will be apparent that pivotal movement of the main lever 38 in a counterclockwise direction, as viewed in FIG. 1 of the drawings, will by virtue of the tie bar 40 cause the shoe supporting arms 24 and 26 to be moved toward each other, and, hence, to apply the brake by causing the brake shoes 20 to move toward each other and toward the brake drum 18.

In order to provide the setting force for setting the spring-set industrial brake illustrated in FIG. 1 there is provided a self-contained tension spring unit, generally designated by the reference numeral 46, comprising a cylinder 48 closed at the bottom and open at the top. A tie rod 52 is reciprocable therein along the longitudinal axis of the cylinder 48. The tie rod 52 is provided at its inner end with an eye-member 54 so that the rod 52 and member 54 form a sort of eye-bolt. The end of the rod 52 extending outside of the cylinder 48 is pivotally secured to the control lever 38 intermediate its ends by a pivot pin 56. A suitable tension spring 58 is disposed within the cylinder 48 with one end thereof hooked within the eye-member 54 and the other end secured to the closed bottom of the cylinder 48, thereby continuously biasing the tie rod 52 downwardly. The spring unit 46 is secured to the base 28 by a hinge pin 62. When the spring unit 46 is the only force applied to the control lever 38, it will bias the control lever 38 in a counterclockwise direction about the pivot pin 39 with the result that the brake is applied to the brake drum 18.

To automatically release the industrial brake, the electrically operated motive unit 16 is provided so that when actuated or energized it will push the control lever 38 clockwise about the pivot pin 39, as viewed in FIG. 1 of the drawings, against the force of the spring unit 46 to the position illustrated in phantom therein. The motive unit 16 includes a working fluid cylinder generally indicated at 64, driven by an electrically operated fluid pump, generally indicated at 66. Hydraulic fluid has been found advantageous over pneumatic fluid and, therefore, the invention is hereinafter described in connection with hydraulic fluid. The working cylinder 64 comprises a generally cylindrical sidewall 68 closed at the bottom by an end wall 70 and containing a piston 72 reciprocably contained therein. A piston rod 74 operatively interconnects the control lever 38 and the piston 72. The piston 72, as heretofore described, is movable relative to the end wall 70, and an expandable pressure chamber 75 is defined in the lower end of the cylinder 64.

In order to supply hydraulic fluid under pressure to the cylinder 64, there is provided the hydraulic pump 66. As herein illustrated, the pump 66 includes an electrical motive device, here shown as an electrical solenoid 76, and a primary or pump cylinder 78 which together function as electrohydraulic means for providing a pressurized working fluid. The cylinder 78 includes a cylindrical sidewall 80 closed at the bottom by an end wall 82 and containing a piston 84 reciprocably positioned therein for movement along the longitudinal axis of the cylindrical wall 80. The piston 84 and end wall 82 are movable relative to each other thereby forming an expandable hydraulic chamber 86 at the lower end of the cylinder 78. The hydraulic chamber 86 communicates with the fluid chamber 75 through a conduit 88 having one end thereof connected to a port 90 in the chamber 86 and the other end thereof connected to a port 92 in the chamber 75. The piston 84 is provided with a check or bypass valve 94 connected to permit fluid to pass therethrough into the chamber 86, but checking or blocking any reverse flow of fluid through the piston 84 out of the chamber 86. A fluid reservoir 96 communicates with the cylinder 78 through a conduit 98 discharging just below the uppermost position of the piston 84 to continuously furnish a supply of working fluid to replace any fluid which may be lost from the system by leakage or otherwise; initial downward movement of the piston 84 blocking the discharge of the reservoir 96 into the cylinder 78.

In order to drive the piston 84, there is provided the electrical solenoid 76 which comprises an alternating current winding 100 and a plunger assembly 102 which is drivingly connected to the piston 84 through a piston rod 104. The plunger assembly 102, as is well known, includes a plunger portion 106 of magnetically attractive material, and additionally includes a pair of pusher bars 108 secured thereto and which, in turn, are pivotally connected to the piston rod 104 by a pivot pin 110.

As illustrated in solid in FIG. 1, the electromotive unit 16 is illustrated in its neutral or deenergized position, so that the brake portion 10 is in a brake-set position. The motive unit 16 is continuously biased to this position by a first compression spring 112 which is positioned above the upper surface of the piston 72 and an upper cover 114 of the cylinder wall 68, thereby continuously biasing the piston 72 downwardly, and additionally, by a second compression spring 116, which is positioned between an upper cover or end wall 118 for the cylinder sidewall 80 and a spring stop 120 secured near the upper end of the piston rod 104. The compression spring 116 continuously biases the piston 84 upwardly to the illustrated neutral position.

In order to provide means for applying electrical power to the electric motor 12, there is provided an electric solenoid operated power switch shown somewhat schematically at 122. As therein illustrated, the switch 122 is connected to close a three-phase alternating current circuit between the motor 12 and a manually-operable main or primary control switch 124 which is connected to a source of three-phase alternating current. Referring now to the switch 122, the switch 122 has a first set of terminals 126 connected to the motor 12 by a set of lines 128 and has a second set of terminals 130 connected to a set of terminals 132 of the switch 124 by a set of lines 134, 136 and 138. A second set of terminals 140 of the switch 124 is adapted to be connected to a set of three-phase alternating current power lines 142. The switch 122 contains a set of switch blades 144 adapted to interconnect the respective terminals 126 and 130 to open and close the switch 122. The switch blades 144 are secured in electrical isolation on an armature assembly 146 which has at least a portion 148 thereof of magnetically attractive material such as soft iron. A solenoid winding 150 is operatively associated with the armature assembly 146 so that, when energized, will be mutually attractive with the magnetically attractive portion 148 thereof thereby to close the switch 122 and apply power to the motor 12. The winding 150 has a first terminal 152 connected to the line 138 and a second terminal 154.

In order to energize the winding 150 to apply power to the motor 12 after a predetermined travel of the control lever 38 of the brake portion 10, there is provided a hydraulically actuated switch 156 including a hydraulic cylinder portion 158 and a switch portion 160. The cylinder portion 158 includes a cylinder wall 162 closed at one end or bottom portion 164 and containing a reciprocable piston 166 longintudinally movable with respect to the cylindrical wall 162. The piston 166 and bottom portion 164 thereof form an expandable chamber 168. The expandable chamber 168 is in communication with the cylinder 64 through a conduit 170 connected to a port 172 in the sidewall 68 of the cylinder 64. The port 172 is positioned a predetermined longitudinal distance along the sidewall 68 vertically from the bottom of the cylinder 64 so that as the piston 72 is moved upwardly the piston 72 will uncover the port 172 after it has moved a predetermined distance, thereby to admit hydraulic fluid into the expandable chamber 168. The piston 166 in the cylinder 158 is continuously biased toward the closed wall 164 by a compression spring 174 positioned between the upper surface of the piston 166 and an end cover 176. The hydraulically actuated switch 156 additionally includes a pair of fixed contacts 178 and a pair of movable contacts 180 contained on the bridging member 182 of electrically conductive material and movable into and out of engagement with the fixed contacts 178 thereby to establish an electrical contact thereacross. The bridging member 182 is operatively connected with the piston 166 through a piston rod 184. One of the contacts 178 is connected to the terminal 154 of the winding 150 and the other of the contacts 178 is connected to one of the lines 136 so that when the hydraulically actuated switch 156 is closed, the solenoid winding 150 is energized and the power switch 122 is closed.

In order to provide for holding the brake portion 10 of the industrial brake in a released position once the motive unit 16 has been actuated to release the brake, there is provided a direct current solenoid 186. The direct current solenoid includes an annular frame 188 of magnetically attractive material, such as soft iron, and terminating in a pair of downwardly facing pole portions 190 and 192. The frame 188 contains a ring-shaped winding 194 adapted to be energized with direct current and connected across a pair of power lines 134 and 136 through a full wave rectifier 196 whenever the main switch 124 is closed. The direct current solenoid 186 additionally includes a disk-shaped stator or armature 198 of magnetically attractive material, such as soft iron, and adapted to engage the pole portions 190 and 192 of the solenoid 186 when the piston 72 is in its energized or brake release position, as illustrated in phantom in FIG. 1. The stator 198 is secured to the piston rod 74 for movement therewith and is effective to hold the piston rod 74 and piston 72 in its brake release position.

In order to provide for disconnection of the solenoid 76 which drives the motive unit 16 after the brake portion 10 has been moved to a released position, there is provided a double pole switch 200 having a pair of normally closed contacts 204 and a pair of normally open contacts 206. The normally closed contacts are serially connected in a series circuit with the winding 100 through leads 208, 210 and 212 across lines 136 and 138 to be energized whenever the switch 124 is closed. Moreover, the contacts 206 are connected in parallel with the hydraulic actuated switch 156 through lines 214 and 216 so that, when closed, they are effective to connect the solenoid 150 across the lines 136 and 138, thereby to energize the solenoid 150 and apply power to the motor 12.

In order to actuate the switch 200, the piston rod 74 is provided with a projection or cam arm 218 which is effective upon upward movement of the piston rod 74 to engage a switch actuating member 220 which separates the contacts 204 and which closes the contacts 206.

In order to provide for a controlled setting of the brake portion 10 upon opening of the main switch 124, a restriction check valve 222 is inserted in the line 88 which interconnects the chambers 75 and 84. The restriction check valve 222 contains a valve housing 224 containing a valve seat 226 and a valve gate or element 228 pivotally mounted on a pin 230 to close against the valve seat 226 during flow of fluid from chamber 75 to chamber 86, but to pivot from the seat 226 during flow of fluid from the chamber 75 to the chamber 86 thereby to provide for an unrestricted flow from chamber 86 into chamber 75. Moreover, in order to control the rate of the return of fluid from chamber 75 into chamber 86, and thereby to control the setting of the brake 10, the valve element 228 is provided with an orifice 232 which permits a restricted flow of fluid from chamber 75 to chamber 86.

From the above description of the improved industrial brake, the operation of the brake is believed clear. However, briefly its operation will hereinafter be described. The industrial brake 10 is spring set by the downward bias of the spring unit 46 acting on the control lever 38 so that when the brake system is deenergized, the tension spring 58 is effective to apply the brake shoes 20 into frictional braking engagement with the brake drum 18 thereby to brake the motor 12. When it is desired to start up the motor 12, the main switch 124 is closed. Immediately upon closing of the main switch 124 a first series circuit is established through lines 208, closed contacts 204, lines 212, solenoid 100 and line 210, thereby to energize the solenoid 76 and to drive the plunger assembly 102 thereof downwardly. Simultaneously, the direct current solenoid 186 has been energized through the rectifier 196. The downward stroke of the plunger 102 is effective to move the piston 84 downwardly in the chamber 86, contracting the chamber 86 and forcing hydraulic fluid through the conduit 88, unobstructed by the check valve 222, into the expansion chamber 75. The hydraulic fluid in the chamber 75 is effective to move the piston 72 upwardly thereby rotating the control lever 38 clockwise and beginning the release of the brake drum 18. After the piston 72 has moved upwardly sufficiently to clear the port 172, hydraulic fluid will enter the cylinder portion 158 and will actuate the hydraulically actuated switch 156 to close the switch portion 160. The closure of the switch 160 is effective to establish a relay control circuit with the winding 150 across the lines 136 and 138 thereby to energize the solenoid winding 150 and to close the power switch 122 applying power to the motor 12. By this time, the brake portion 10 has substantially released so that the motor 12 will not start against a restraining bias of a set brake. Continued upward movement of the piston 72 is effective first to close the contacts 206 thereby to shunt across the switch 160 and secondly to open the contacts 204, disconnecting the winding 100 from the line and deenergizing the solenoid 76. The stator 198 has engaged the pole portions 190 and 192 of the direct current solenoids 186 and the piston 72 is held in this open position.

Upon deenergization of the solenoid 76, the piston 84 is moved upwardly due to the bias of the compression spring 116; the piston 84 can move freely in the cylinder 78 without restriction from the hydraulic fluid therein because of the bypass valve 94 which permits fluid to flow from above the piston 84 into the expandable chamber 86 below the piston. The bias of the compression spring 174 will also cause the piston 166 to move to the left, as viewed in FIG. 1, thereby opening the switch portion 160; however, the switch 160 has now been shunted by the contacts 206 which are now closed by the engagement of the cam portion 218 with the actuating lever 220 and the solenoid winding 150 remains energized so that the power switch 122 remains closed. The hydraulic fluid from the chamber 168 is returned through the conduit 170 and conduit 88, and through the orifice 232 in the valve member 228 into the expandable chamber 86 and the fluid reservoir 96.

When it is desired to stop the motor 12, the main switch 124 is opened so that the power to the motor 12 is shut off and simultaneously the direct current to the winding 194 is shut off thereby deenergizing the solenoid 186. The stator 198 will, therefore, no longer be held in an upward position by the pole portions 190 and 192 and the bias of the compression spring 112 will be effective to move the piston 72 downwardly. However, due to the restriction offered by the orifice 232 to the return flow of hydraulic fluid in the conduit 88, the piston 72 will move downwardly at a predetermined controlled rate. The tension spring 58 is effective to move the control lever 38 counterclockwise to apply the brake portion 10 as the piston rod 74 moves downwardly. In this manner the rate of application of the brake portion 10 after removal of the power to the system is controlled.

Figure 2:
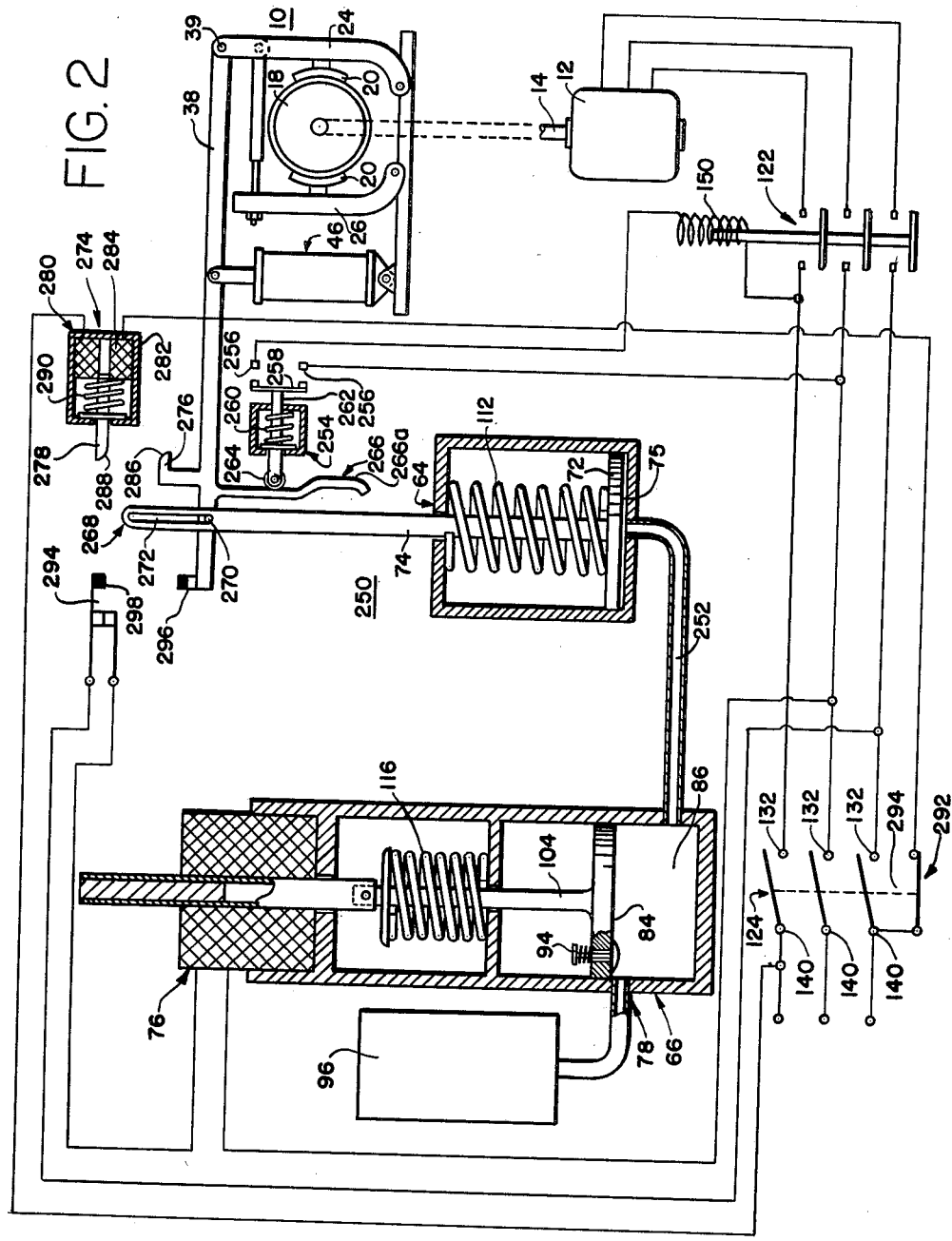
FIG. 2 is a somewhat schematic illustration of a spring-set, electrohydraulically released industrial brake according to another embodiment of the present invention.

The embodiment of FIG. 2 illustrates a spring-set electrohydraulically released industrial brake according to another embodiment of the present invention wherein the brake control lever is mechanically latched and electromagnetically released from the brake released position, and wherein the spring setting of the brake is accomplished with the smallest possible time delay. Similar parts of FIG. 2 and FIG. 1 are identified by the same reference numerals. Referring now specifically to FIG. 2, there is illustrated an industrial brake including a brake portion illustrated generally at 10 and mechanically coupled to a three-phase electric motor 12 by means of a shaft 14 and controlled by an electrohydraulic motive unit 250. As heretofore described, the brake portion 10 includes the brake drum 18 frictionally engageable by the pair of brake shoes 20 supported from the pair of shoe supporting arms 24 and 26. The main control rod member or lever 38 is provided for causing relative movement between the brake shoes 20 and brake drum 18 in the manner heretofore described in connection with the embodiment of FIG. 1. In order to provide the setting force for setting the spring-set industrial brake, there is provided the self-contained tension spring unit generally designated by the reference numeral 46. The spring unit 46 is effective to bias the control lever 38 in a counterclockwise direction about the pivot pin 39 with the result that the spring unit 46 continuously biases the brake portion 10 into a brake set position.

To automatically release the industrial brake, the electrically operated motive unit 250 is provided, which is similar to the unit 16 of FIG. 1, so that when actuated or energized it will push the control lever 38 clockwise about the pivot pin 39, as viewed in FIG. 2 of the drawings, against the force of the spring unit 46. The motive unit 250 includes the working fluid cylinder generally indicated at 64, driven by an electrically operated hydraulic pump generally indicated at 66. The working cylinder 64 contains the piston 72 reciprocally contained therein. The piston rod 74 operatively interconnects the control lever 38 and the piston 72 in a manner hereinafter more fully described. The piston 72 is movable relative to the end wall of the cylinder 64 so that the expandable pressure chamber 75 is defined in the lower end of the cylinder 64.

In order to supply hydraulic fluid under pressure to the cylinder 64, there is provided the hydraulic pump 66 which is identical to the hydraulic pump heretofore described in reference to the embodiment of FIG. 1, and which, briefly, includes the electrical motive device, here shown as an electrical solenoid 76, and the primary or pump cylinder 78 which together function as an electrohydraulic means or pump for providing a pressurized working fluid. The cylinder 78 includes the piston 84 reciprocally positioned therein for movement along the longitudinal axis of the cylinder 78. The piston 84 is movable relative to an end wall of the cylinder 78 thereby forming the expandable hydraulic chamber 86 at the lower end of the cylinder 78. The hydraulic chamber 86 communicates with the fluid chamber 75 through an unrestricted conduit 252. The piston 84 is provided with the check or bypass valve 94 connected to permit fluid to pass therethrough into the chamber 86, and checking or blocking any reverse flow of fluid through the piston 84 out of the chamber 86. The fluid reservoir 96 communicates with the cylinder 78 discharging this fluid from the uppermost position of the piston 84 to continuously furnish a supply of hydraulic fluid to replace any fluid which may be lost from the system by leakage or otherwise; as heretofore described, initial downward movement of the piston 84 blocks the discharge of the reservoir 96 into the cylinder 78.

In order to drive the piston 84, there is provided the electrical solenoid 76 which is identical to that heretofore described in the embodiment of FIG. 1 and which is drivingly connected to the piston 84 through the piston rod 104. The electromotive unit 250 is illustrated in FIG. 2 with the solenoid 76 thereof in its neutral or deenergized position so that the brake portion 10 is in a brake set position due to the bias of the spring unit 46. The electromotive unit 250 is continuously biased to this position by the first compression spring 112 positioned to bias the piston 72 downwardly, and additionally, by the second compression spring 116, which is positioned to continuously bias the piston 84 upwardly to the illustrated position.

In order to provide means for applying electrical power to the electric motor 12, there is provided the electric solenoid operated power switch 122. Additionally, there is provided the manually operable main or primary control switch 124 which has the first set of terminals 140 connected to a source of three-phase alternating current and which is serially connected to the motor 12 through the solenoid operated power switch 122. The solenoid operated power switch 122, as heretofore described, includes the solenoid winding 150, which, when energized, closes the switch 122 thereby electrically connecting the motor 12 across the terminals 132 of the main switch 124.

In the embodiment of FIG. 2, the winding 150 is energized after a predetermined travel of the control lever 38 through a normally open position sensing switch 254 serially connected across one phase of the terminals 132 of the main switch 124 with the solenoid winding 150 of the solenoid operated power switch 122 and is connected to be controlled by the position of the main lever 38 to apply power to the motor 12 after a predetermined movement of the lever 38 and release of the brake portion 10 thereof. It is to be understood that the switches 122 and 254 may also be connected to remove power from the motor 12 after the brake portion 10 has been set a predetermined amount. The switch 254 includes a pair of contacts 256 adapted to be electrically bridged by a bridging member 258 which is continuously biased out of engagement with the contacts 256 by a compression spring 260. The switch 254 is provided with a control rod 262 having one end thereof connected to the bridging member 258 and provided with a cam following roller 264 at the other end thereof adapted to ride on a cam surface 266 extending from the control lever 38. The cam surface 266 is provided with a lobe 266a of sufficient height to move the cam roller 264 and control rod 262 to the right, as viewed in FIG. 2, upon upward or clockwise movement of the control rod 38, thereby to close the contacts 256 with the bridging member 258 and to energize the solenoid winding 150 of the power switch 122. It will be appreciated that power is supplied to the motor 12 through the power switch 122 dependent on the position of the control lever 38.

In order to permit the electrohydraulic motive unit 250 to return to a neutral position upon de-energization of the solenoid 76 thereof, while the brake portion 10 is maintained in a release position, the piston rod 74 is connected to the control lever 38 through a lost motion connection illustrated generally at 268 and including a pin 270 extending from the control lever 38 and riding in a slot 272 in the piston rod 74. The slot 272 is positioned so that when the brake portion 10 is set and the solenoid 76 is de-energized, the pin 270 is at the bottom of the slot 272, in the position illustrated in FIG. 2. From this position, initial energization of the solenoid 76 which moves the piston rod 74 upwardly will rotate the control lever 38 clockwise through engagement of the pin 270 in the end of the slot 272. However, the slot 272 permits the piston rod 74 to move downwardly when the power is removed from the solenoid 76 while at the same time not affecting the position of the control lever 38.

In order to hold the brake portion 10 in the release position, there is provided the latch mechanism 274 which provides a mechanical latching of the control lever 38, and an electromagnetic release thereof. Specifically, the control lever 38 is provided with a latch portion 276, and a movable bolt portion 278 is provided to operatively engage the latch portion 276 to hold the control lever 38 in the latched position. The bolt portion 278 is formed of soft iron or other magnetically attractive material and serves as a plunger for an electric solenoid 280 formed of a stator or frame 282 containing a solenoid winding 284. The latch portion 276 and the bolt portion 278 are provided with effective cam surfaces 286 and 288 so that vertical movement of the latch portion 276 is effective to cam the bolt portion 278 to the right, as viewed in FIG. 2, against the return bias of a compression spring 290, thereby causing latching of the lever 38. The solenoid 280 is serially connected with a brake setting switch 292 which is normally closed, but which is mechanically coupled to the main switch 124 through an actuating rod 294 so that the brake setting switch 292 is closed when the power switch 124 is open and is actuated to the open position when the main switch 124 is closed. It will be appreciated that closing of the brake setting switch 292 is effective to energize the solenoid 280, causing the bolt portion 278 to be drawn to the right, and releasing the latch mechanism 274.

The electrical energization of the solenoid 76 which drives the motive unit 250 after the brake portion 10 has been moved to a release position is provided for in the same manner as that heretofore described in connection with the embodiment of FIG. 1. Specifically, there is provided a normally closed switch 294 serially connected with the solenoid 76 across one phase of the three phase alternating current at the disconnect side of the main switch 124; that is, to a pair of the terminals 132 thereof. The switch 294 is actuated to an open position by the engagement of a projection or cam arm 296 from the main lever 38 with a switch actuator 298 when the main lever 38 is in the brake released position.

From the above description of the industrial brake according to the embodiment of FIG. 2, the operation thereof is believed clear. However, briefly, its operation will hereinafter be described. The industrial brake portion 10 is spring set by the downward bias of the spring unit 46 acting on the control lever 38 when the brake system is deenergized, the tension spring unit 46 being effective to apply the brake shoes 20 into frictional engagement with the brake drum 18 thereby to brake the motor 12. When it is desired to start up the motor 12, the main switch 124 is closed. However, the power switch 122 is open so that power is not applied immediately to the motor 12. Immediately upon closing of the main switch 124, a first series circuit is established through the solenoid 76 and switch 294 across one phase of the alternating current supply, thereby to energize the solenoid 76 and to drive the piston 84 thereof downwardly. The downward stroke of the piston 84, acting against the return bias of the compression spring 116, is effective to pressurize the hydraulic fluid in the chamber 86 and the hydraulic fluid will flow through the conduit 252 from the chamber 86 into the expansion chamber 75. The pressurized hydraulic fluid in the chamber 75 is effective to move the piston 72 upwardly against the return bias of the spring 112 thereby rotating the control lever 38 clockwise and beginning the release of the brake drum 18. After the piston 72 has moved upwardly sufficiently for the lobe 266a of the cam surface 266 to engage the cam roller 264, the position sensing switch 254 is closed thereby. The closure of the switch 254 is effective to establish a relay control circuit with the winding 150 across one phase of the alternating current supply source thereby to close the power switch 122 and apply power to the motor 12. By this time, the brake portion 10 has substantially released so that the motor 12 does not start against a restraining bias of a set brake. The final upward increment of movement of the piston 72 is effective first to mechanically latch the mechanism 274, thereby to hold the control lever 38 in a brake release position, and secondly to open the switch 294, disconnecting the solenoid 76 from the power line.

Immediately upon deenergization of the solenoid 76, the piston 84 is moved upwardly due to the bias of the compression spring 116 and, simultaneously, the piston 72 is moved downwardly due to the bias of the compression spring 112, the hydraulic fluid flowing from the chamber 75 into the chamber 86 through the unobstructed conduit 252. The piston 72 and piston rod 74 can move downwardly freely without restraint from the control lever 38 because of the pin and slot connection 268. The pin 270 will move relative to the slot 272 during the downward movement of the piston rod 74, the rod 38 being held by the latch mechanism 274. The switch 254 remains closed and the solenoid winding 150 remains energized so that the power switch 122 is closed. It will be appreciated that power is supplied to the motor 12 through the power switch 122 dependent on the position of the control lever 38.

When it is desired to stop the motor 12, the main switch 124 is open so that power to the motor 12 is shut off and simultaneously the brake setting switch 292 is closed energizing the solenoid 280 to release the latch mechanism 274. The control lever 38 is no longer held in an upward position and the spring unit 46 of the brake portion 10 is effective to move the control lever counterclockwise to set the brake. The setting is accomplished very rapidly since the movement of the control lever 38 is not restrained by the flow of hydraulic fluid in the electrohydraulic motor unit 250, as was utilized in the embodiment of FIG. 1 to control the setting of the brake portion 10.

The immediate return of the electrohydraulic motive unit 250 to its neutral or deenergized position is advantageous in those instances where it is desirable to effect rapid setting of the brake portion 10 upon stopping of the motor 12.

FIG. 3 illustrates an industrial brake wherein the electromotive unit takes the form of an electrohydraulic motive unit illustrated generally at 300 and driven by an electric motor 302 as the electromotive device. The arrangement as therein illustrated is particularly advantageous in providing an electrically operated industrial brake having a very short time delay. Similar parts of FIG. 3 and of FIGS. 1 and 2 are identified by the same reference numerals. Referring now specifically to FIG. 3, there is illustrated an industrial brake including a brake portion illustrated generally at 10 and mechanically coupled to a three-phase electric motor 12 by means of a shaft 14 and controlled by the electrohydraulic motive unit 300. As heretofore described, the brake portion 10 includes the brake 18 frictionally engageable by the pair of brake shoes 20 supported from the pair of shoe supporting arms 24 and 26. The main control rod or lever 38 is provided for causing relative movement between the brake shoes 20 and brake drum 18 in the manner heretofore described in connection with the embodiments of FIGS. 1 and 2. In order to provide the setting force for setting the spring-set industrial brake, there is provided the self-contained tension spring unit 46 which biases the control lever 28 in a counterclockwise direction about the pivot pin 39 with the result that the spring unit 46 continuously biases the brake portion 10 into a brake-set position.

To automatically release the industrial brake, the electrically operated motive unit 300 is effective when actuated or energized to push the control lever 38 clockwise about the pivot pin 39, as viewed in FIG. 3 of the drawings, against the return bias of the spring unit 46. The motive unit 300 includes the working fluid cylinder generally indicated at 64, driven by an electrically operated hydraulic pump generally indicated at 304 and including the electric motor 302. The working cylinder 64 contains the piston 72 reciprocally contained therein. The piston rod 74 operatively interconnects the control lever 38 and the piston 72 through a pin connection 306. The piston 72 is movable relative to the end wall of the cylinder 64 so that the expandable pressure chamber 75 is defined in the lower end of the cylinder 64.

In order to supply hydraulic fluid under pressure to the cylinder 64, there is provided the hydraulic pump unit 304 and including a cylindrical casing 310 closed at its lower end by an end plate 312 to form a pump chamber 314. The pump unit 304 is hydraulically connected to the fluid cylinder 64 by a hydraulic conduit 316. A propeller housing 318 is positioned in the cylindrical casing 310 intermediate its end to divide the pump chamber 314 into a lower or discharge portion 320 and an upper or inlet portion 322. A propeller or turbine 324, which may be of the centrifugal type, is positioned in the propeller housing 318 and is effective when driven to pump hydraulic fluid from the inlet portion 322 into the discharge portion 320. In order to drive the propeller 324, there is provided the electric motor 302 which is connected to the propeller 324 through a clutch assembly 325. The electric motor 302 is provided with a hollow armature shaft 326 provided with a friction clutch disc 328 at its upper end. A propeller shaft 330 connected to the propeller 324 extends entirely through the hollow shaft 326 of the motor 302 and the clutch disc 328 connected thereto. Splined to the upper end of the propeller shaft 330 is a clutch plate assembly 332 including a friction clutch disc 334 connected to a plunger 336 of an electromagnetic solenoid 338. The electromagnetic solenoid 338 is additionally provided with a winding or coil 340 which is effective when energized to magnetically attract the plunger 336, thereby biasing the clutch plate assembly 332 downwardly so that the friction clutch disc 334 thereof frictionally engages the friction clutch disc 328 coupled to the shaft 326 of the motor 302, thereby mechanically coupling the propeller 324 to the motor 302. The propeller shaft 330 is connected to rotate with the clutch plate assembly 332 through cooperating splines on the clutch plate assembly 332 and the propeller shaft 330. Driving of the propeller 324 is effective to pump hydraulic fluid from the inlet portion 322 into the discharge portion 320 and through the hydraulic conduit 316 into the expandable portion 75 of the cylinder 64, thereby to move the piston rod 74 upwardly to release the brake portion 10.

In order to provide for holding the brake portion 10 in a released position once the motive unit 16 has been actuated, there is provided the direct current solenoid 186, more fully described in connection with the embodiment of FIG. 1.

In order to provide for disconnection of the solenoid 338 which clutches the propeller 324 to the driving motor 302 after the brake portion 10 has been moved to a released position, there is provided a normally closed switch 342 serially connected with the winding 340 through a line 344 and serially connected across one phase on the disconnect side of the main switch 124 through a pair of lines 346 and 348. The piston rod 74 is provided with the projection or cam arm 218 which is effective upon predetermined upward movement of the piston rod 74 to engage the switch actuating member 220 which opens the switch 342.

In order to provide for energization of the motor 302, the motor 302 is serially connected with a motor switch 350 through a line 352 and is serially connected across one phase of the three-phase power lines 142 by lines 354 and 356. The motor switch 350 provides for selectively running the motor 302 without regard to the position of the main switch 124 which is connected to supply power to the motor 12.

The direct current solenoid is connected across one phase of the three-phase alternating supply source on the disconnect side of the main switch 124 through the full wave rectifier 196 to be energized whenever the main switch 124 is closed.

From the above description of FIG. 3, the operation of the industrial brake therein disclosed is believed clear. However, briefly, its operation will be described. The industrial brake portion 10 is spring set by the downward bias of the spring unit 46 acting on the control lever 38. When the brake system is de-energized, the tension spring unit 46 is effective to apply the brake shoes 20 into frictional engagement with the brake drum 18, thereby to set the brake of the motor 12. When it is desired to start up the motor 12, the motor 302 in the pump unit 304 is first brought up to speed by closing of the switch 350. After the motor 302 has come to full speed, power is applied to the motor 12 by closing the main switch 124. Immediately upon closing of the main switch 124, the solenoid 338 is energized through the series circuit including the line 348, the winding 340, the line 344, the switch 342, and the line 346 so that the plunger 336 thereof is magnetically attracted by the winding 340 and the clutch assembly 325 is effective to mechanically couple the rotating shaft 326 of the motor 302 and the propeller 324.

Immediately upon closing the main switch 124, the D.C. holding solenoid 186 is energized through the full-wave rectifier 196. The solenoid 186 will hold the piston rod 74 in its upper position until such time as the solenoid 186 is de-energized by opening of the power switch 124. Moreover, as soon as the piston rod 74 is moved vertically a sufficient distance for the cam arm 218 to open the switch 342, the solenoid 334 will be de-energized and the propeller 324 will be operatively disconnected from the shaft 326 of the motor 302. Once the brake portion 10 has been released, the motor 302 may be de-energized by manually opening the switch 350.

Opening of the main switch 124 disconnects the power from the motor 12 and simultaneously de-energizes the holding solenoid 186 so that the piston 72 is biased downwardly by the force of the spring 112 and hydraulic fluid from the expandable chamber 75 is driven through the conduit 316 back into the cylindrical casing 310 of the pump unit 304, the fluid freely flowing around the propeller 324 to return to the inlet portion 322 of the pump unit 304.

It will be appreciated that since the electric motor 302 has first been brought to full speed prior to the application of power through the main switch 124, the propeller 324 is clutched directly to the running motor 302 and the high moment of inertia of the rotating motor armature is effective in accelerating the propeller, the moment of inertia of which is very small. The propeller 324 therefore accelerates very rapidly and is effective to pump hydraulic fluid from the inlet portion 322 into the discharge portion 320 almost instantly upon closing of the power switch 124. The hydraulic fluid in the discharge portion 320 is discharged through the conduit 316 into the expansion chamber 75 where it is effective to instantly move the piston 72 upwardly and to quickly release the brake portion 10.

Similarly, where it is desired to minimize the time constant of operation for the removal of hydraulic pressure from the system, the propeller 324 is declutched from the rotating armature shaft 326 by de-energization of the solenoid 338 in the clutch assembly 325. The propeller will, of course, continue running so long as it has sufficient kinetic energy. However, since the moment of inertia is very minute as compared to the moment of inertia of the motor armature, the propeller will instantly come substantially to a dead stop, thereby relieving the hydraulic pressure in the motive unit 300 instantly.

While the embodiment of FIG. 3 illustrates an electrohydraulic unit which minimizes the time constant of operation, and provides for the instant formation of a high pressure and the instant reduction of the pressure by clutching and declutching of the propeller 324 to and from the rotating armature shaft 326, it is also possible to completely reverse the pressure from a positive to a negative value by, for example, reversing the direction of rotation of the propeller or by reversing the pitch of the propeller. One such embodiment is illustrated somewhat schematically in FIG. 4. Similar parts of FIGS. 3 and 4 are identified by the same numerals.

Referring now to FIG. 4, there is disclosed an electrohydraulic pump unit 360 having the outer cylindrical casing 310 divided by the propeller housing 318 into a lower or discharge portion 320 and an upper or inlet portion 322. The electric motor 302 is connected to drive the propeller 324 located in the propeller housing 318. The propeller shaft 330 is operatively connected with the motor shaft 326 through the solenoid clutch assembly 325. Additionally, the propeller 324 is of reversible pitch, a pitch reversing mechanism 364 of conventional known construction is operatively connected to the propeller 324 to control the pitch of the propeller. As is well known, depending on the direction of the pitch of the propeller 324, the propeller 324 when driven by the motor 302 may be selectively effective to transfer or pump hydraulic fluid between the chambers 320 and 322 in either selected directions.

FIG. 5 illustrates an embodiment of the invention wherein an external holding magnet is utilized to hold the brake in its released position. The external magnet is shown as applied to a brake system employing the principles of operation of FIG. 2.

Referring now specifically to FIG. 5, there is illustrated the working cylinder 64 of an electropneumatic motive unit and including a piston 72 connected to a piston rod 74 and biased downwardly as viewed in FIG. 5, by the compression spring 112. The piston rod 74 is connected to the control lever 38 of a brake unit through the pin and slot connection 268 including the pin 270 connected to the lever 38 and slidably received in the slot 272 in the piston rod 74.

The pin and slot connection 268 is effective to permit the control lever 38 to be retained in a released position while the working cylinder 64 returns to a neutral or deenergized position.

In order to hold the brake in the released position, there is provided an electromagnetic solenoid 370, preferably of the direct current type, and including a frame 372 of magnetic material supporting a winding 374 having a pair of terminals 376 adapted to be connected to a source of electrical energy, such as a rectifier or an alternating current supply, and additionally including a plunger 378 connected to the lever 38. Upward movement of the piston rod 74 moves the lever 38 clockwise bringing the plunger 378 into engagement with the sealed portion 372 of the solenoid 370 and energization of the winding 374 is thereafter effective to hold the lever 38 in this position. It will be appreciated that only a small source of electrical energy is necessary to hold the plunger 378 against the frame 372 once the plunger 378 has engaged the frame.

The operation of the embodiment of FIG. 5 is similar to that illustrated in the embodiment of FIG. 2 except that the lever 38 is held in a released position in FIG. 5 by the electromagnetic solenoid 370 and in FIG. 2 by the mechanical latch mechanism 274, which is electrically released.

It will be seen that according to the present invention a very rapidly operating electromotive unit for an industrial brake is provided. Moreover, although a motive unit is utilized with an industrial brake which does not operate with the required rapidity, the slowness of operation of the electromotive unit may be compensated for by controlling the starting or stopping of the prime mover after a predetermined setting or release of the brake; in this manner many of the disadvantages of a slowly actuating brake are eliminated.

While several embodiments of the invention have been described by way of illustration, many modifications will occur to those skilled in the art. It is therefore intended in the appended claims to cover all such modifications as fall within the true spirit and scope of this invention.

What is claimed as new and desired to be secured by Letters Patent of the United States is:

1. An industrial brake for controlling a prime mover and comprising a brake drum adapted to be coupled with said prime mover, brake means for frictionally engaging said drum, a control rod connected to actuate said brake means between a brake-set position and a brake-released position, spring means biasing said rod toward a brake-set position, an electrohydraulic motive unit for driving said rod to a brake-released position, said motive unit including an electrically actuated pump for supplying hydraulic fluid under pressure and a cylinder having a piston reciprocable therein and communicating with said pump, a piston rod interconnecting said piston and the first mentioned rod, means for applying power to said prime mover, and means responsive to the position of one of said rods and controlling said last mentioned means for applying said power to said prime mover after the last referred to rod has moved a predetermined distance.

2. An industrial brake as set forth in claim 1 above and additionally including means for shutting off the power from the motive unit after the piston has moved a predetermined distance.

3. An industrial brake for controlling a prime mover and comprising a brake drum adapted to be coupled with said prime mover, brake means for frictionally engaging said drum, a control rod connected to actuate said brake means between a brake-set position and a brake-released position, spring means biasing said rod toward a brake-set position, an electrohydraulic motive unit for driving said rod to a brake-released position, said motive unit including an electrically actuated pump for supplying hydraulic fluid under pressure and a cylinder having a piston reciprocable therein and communicating with said pump, a piston rod interconnecting said piston and the first mentioned rod, means for applying power to said prime mover, and means responsive to the position of one of said rods for operating said last mentioned means after at least one of said rods has moved a predetermined distance.

4. An industrial brake for controlling a prime mover and comprising a brake drum adapted to be coupled with said prime mover, brake means for frictionally engaging said drum, a control rod connected to actuate said brake means between a brake-set position and a brake-released position, spring means biasing said rod toward a brake-set position, an electrohydraulic motive unit for driving said rod to a brake-released position, said motive unit including an electrically actuated pump for supplying hydraulic fluid under pressure, a cylinder having a piston reciprocable therein, a conduit interconnecting said pump and said cylinder, restriction means in said conduit for controlling the rate of flow from said cylinder to said pump, check means in said conduit for providing an unrestricted flow from said pump to said cylinder, a piston rod interconnecting said piston and the first mentioned rod, means for applying power to said prime mover, and means responsive to the position of one of said rods and controlling said last mentioned means for applying said power to said prime mover after the last referred to rod has moved a predetermined distance.

5. An industrial brake for controlling a prime mover and comprising a brake drum adapted to be coupled with said prime mover, brake means for frictionally engaging said drum, a control rod connected to actuate said brake means between a brake-set position and a brake-released position, spring means biasing said rod toward a brake-set position, an electrohydraulic motive unit for driving said rod to a brake-released position, said motive unit including an electrically actuated pump for supplying hydraulic fluid under pressure and a cylinder having a piston reciprocable therein and communicating with said pump, a piston rod connected to said piston, lost motion means interconnecting said piston rod and the first mentioned rod for providing movement of said piston rod in one direction free of said first mentioned rod and movement in the other direction being effective to move said first mentioned rod to one of said positions, means for applying power to said prime mover, and means responsive to the position of one of said rods and controlling said last mentioned means for applying said power to said prime mover after the last referred to rod has moved a predetermined distance.

6. An industrial brake as set forth in claim 4 above and additionally including means independent of the piston rod for holding said first mentioned rod in said one of its positions.

7. An industrial brake comprising a brake drum, brake means for frictionally engaging said drum, lever means connected to actuate said brake means and movable between a brake-set position and a brake-released position, spring means biasing said lever toward one of said positions, a fluid cylinder including a piston reciprocable in said cylinder connected to move said lever to the other of said positions, an electrically operated fluid pump connected to supply fluid under pressure to said cylinder and including a fluid cylinder communicating with the first-mentioned cylinder, propeller means in said cylinder, electrical motor means connectable to drive said propeller means, clutch means for drivingly connecting said motor means and said propeller means, and means for holding said lever in said other of said positions.

8. An electrohydraulic motive unit for operating an industrial brake and like devices and including a first cylinder closed at one end and having a port adjacent said closed end, hydraulic fluid in said cylinder, electromechanical means for pressurizing said fluid and comprising propeller means in said first cylinder, an electrical motor connected to drive said propeller means, clutch means drivingly interconnecting said motor means and said propeller means, a second cylinder closed at one end and having an opening through the other end, a piston reciprocable in said second cylinder, a port adjacent said closed end of said second cylinder, conduit means communicating between said ports, and a piston rod connected to said piston and extending through said opening.

9. An electrohydraulic motive unit as set forth in claim 8 above wherein said clutch means includes means for reversing the direction of said propeller.

10. An electrohydraulic motive unit as set forth in claim 8 above wherein said clutch means includes means for reversing the pitch of said propeller.

11. An industrial brake for controlling a prime mover and comprising a brake drum adapted to be coupled with said prime mover, brake means for frictionally engaging said drums, a control rod connected to actuate said brake means between a brake-set position and a brake-released position, spring means biasing said rod toward one of said positions, an electrically actuated motive unit connected to move said rod to the other of said positions, means for applying power to said prime mover, and means associated with said motive unit for controlling said last means relative to the movement of said rod toward at least one of said positions.

References Cited by the Examiner
UNITED STATES PATENTS

| | | | |
|---|---|---|---|
| 1,993,612 | 3/35 | Lum | 188—170 |
| 2,365,557 | 12/44 | Keith | 188—158 |
| 2,670,449 | 2/54 | Brice | 192—.2 |

DON A. WAITE, *Primary Examiner.*